Sept. 9, 1924.

H. C. VERHEY

FISHING REEL

Filed Aug. 30, 1922

1,507,638

Inventor:
Hubert C. Verhey
By F. DeWitt Goodwin
Attorney

Patented Sept. 9, 1924.

1,507,638

UNITED STATES PATENT OFFICE.

HUBERT C. VERHEY, OF OCEAN CITY, NEW JERSEY.

FISHING REEL.

Application filed August 30, 1922. Serial No. 585,140.

*To all whom it may concern:*

Be it known that I, HUBERT C. VERHEY, a citizen of the United States, residing at Ocean City, in the county of Cape May and State of New Jersey, have invented certain new and useful Improvements in a Fishing Reel, of which the following is a specification.

My invention relates to improvements in a fishing reel and the object of my invention is to provide a reel having an exposed braking surface or drum adapted for thumbing the reel to retard the free rotation of the reel as may be required during casting; a further object of my invention is to provide a thumb rest upon the frame whereby the pressure of the thumb upon the braking surface of the spool may be delicately regulated by partially resting the thumb upon the thumb rest and upon the braking surface of the spool; and a still further object of my invention is to provide a brake shoe adapted to be moved into contact with the brake drum and to further provide locking means for holding the brake shoe in contact with said drum, thus forming a constant and uniform drag upon the line leading from the reel. Said locking means being so arranged that additional pressure may be applied to the brake shoe, when desired, without disengaging said locking means.

Figure 1:
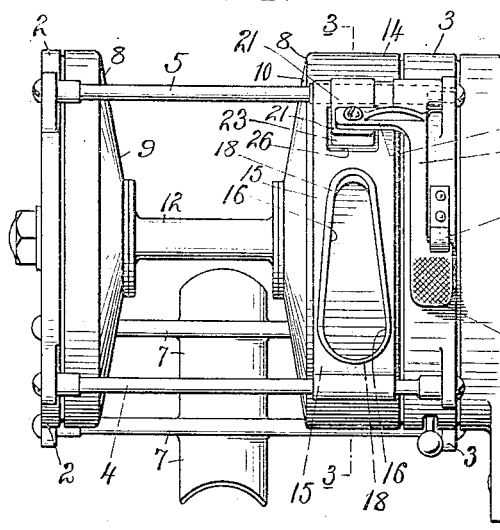
Figure 2:
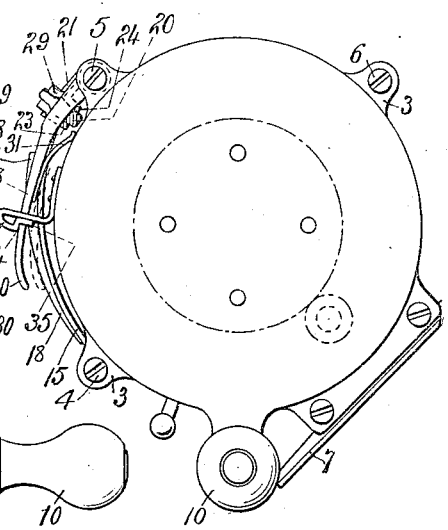
Figure 3:
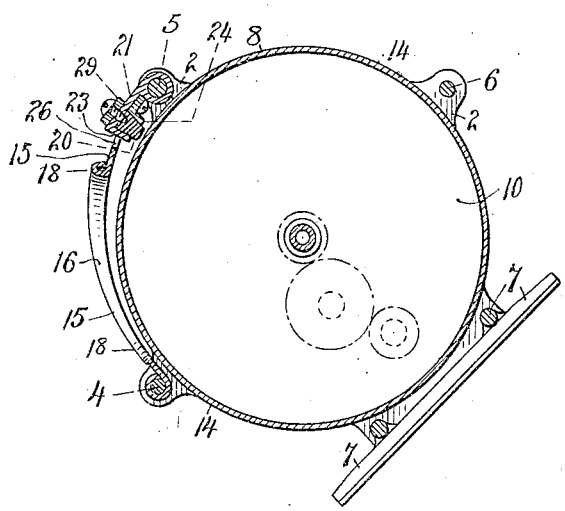
Figure 4:
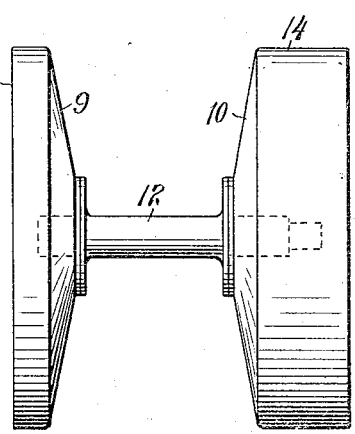

Referring to the accompanying drawings; Fig. 1, is a side elevation of my improved reel; Fig. 2, is an end view of Fig. 1; Fig. 3, is a transverse section on line 3—3 Fig. 1; and Fig. 4, is a side elevation of the spool detached, showing the novel form of braking surface.

In the drawings in which like reference characters refer to like parts, 1 represents the frame consisting of the end members 2 and 3 rigidly secured together by rods 4, 5, and 6 and the base member 7.

The spool 8 is rotatably mounted in bearings formed in the end members 2 and 3 and is adapted to be rotated by the handle 10, by means of gearing detachably connected with the spool 8. Said gearing is shown diagrammatically in dotted lines, in the drawing, as it is well known in the art.

The spool 8 consists of the end heads 9 and 10 mounted upon the connecting sleeve 12. Upon one end head of the spool is provided a cylindrical extension, or flange, which forms a brake drum 14, providing an exposed braking surface adapted for placing the thumb thereon to retard the too rapid spinning of the spool when casting the line.

Between the rods 4 and 5 is mounted a rigid plate or thumb rest 15, which is positioned immediately over the braking surface of the drum 14. Said plate 15 is provided with an aperture 16, formed therethrough for the insertion of the thumb for the purpose of exerting a pressure upon the braking surface of the drum 14. The aperture 16 formed in the plate 15 is elongated, and also made smaller at one end than at the other end for the purpose of gradually lifting the thumb from the brake drum 14 as the thumb is moved over the rest plate 15 towards the smaller end of the aperture 16. By drawing the thumb towards the large end of said aperture 16, the thumb can pass further through the aperture 16 and exert a greater pressure upon the drum 14. Said plate 15 forming the thumb rest, is provided with a turned edge 18 surrounding the aperture 16 to prevent the edge from cutting the thumb. Said turned edge 18 is of greater diameter at the smaller end of the aperture 16 and gradually diminishes towards the larger end of said aperture, thus forming a surface or guide, which is inclined in relation to the cylindrical surface of the brake drum 14, upon which the thumb may slide. The angle of the surface of the thumb rest for guiding the thumb may be further increased by positioning the plate 15 eccentrically in relation to the cylindrical surface of the drum 14, thus forming a thumb rest upon which the thumb may be guided so as to exert various degrees of pressure upon the drum 14 when casting the line from the reel, by sliding the thumb to various positions throughout the length of the aperture 16 formed in the rest plate 15.

A brake shoe 20 is provided for exerting a drag upon the braking surface of the drum 14, forming a drag which is silent in operation. An arm 21 is pivotally mounted upon the rod 5 of the frame. A turned flange 23, is formed upon the arm 21 for holding a piece of leather, forming the break shoe 20, which is clamped between said flange 23 and a clamp-plate 24. The plate 15 is provided with an opening 26, which is occupied by the arm 21, thus permitting the brake shoe 20, to engage the brake drum 14.

A lever 28, is provided for operating the brake shoe 20. Said lever is also loosely pivoted upon the rod 5, and positioned at one side of the thumb rest 15. An extension arm 29 upon the lever 28 is secured to the arm 21 of the brake shoe for actuating the latter, when the handle 30 of the lever 28 is pressed by the finger to apply the brake shoe to the drum 14. A spring 31 is provided for lifting the lever 28 and the brake shoe 20 from the drum.

A spring latch 33 is secured to the frame member 3, and it is provided with two notches or shoulders 34 and 35 for engaging the lever 28. The shoulder 35 is adapted to hold the lever in a position to apply the brake shoe 20 to the drum 14. Said spring latch 33 is so arranged that additional braking pressure may be applied upon the handle 30 by the finger, and when released the shoulder 35 will again engage the lever 28 and still hold the brake shoe in engagement with the drum 14. By a slight pressure of the finger upon the outer end of the spring latch 33, the lever 28 will be moved against the stop 34 by the spring 31, thus disengaging the brake shoe 20 from the drum, as shown in Fig. 2.

When it is found necessary to renew the leather brake shoe 20, the spring latch 33 may be forced so as to entirely release the lever 28, and the lever will then be free to swing around the pivot shaft 5, making the clamp-plate 24 for retaining the leather brake shoe readily accessible.

Having thus described my invention I claim and desire to secure by Letters Patent:—

1. A fishing reel comprising, a frame, a spool rotatably mounted in the frame, a brake drum upon the spool adapted to be retarded by flesh pressure of the thumb, a thumb rest secured upon the frame and positioned above and extending over the braking surface of the drum upon which rest the end of the thumb is adapted to ride when the thumb is moved around the braking surface of the drum.

2. A fishing reel comprising, a frame, a spool rotatably mounted upon the frame, a braking surface formed upon the spool adapted for applying thumb pressure to retard the rotation of the spool, a thumb rest secured upon the frame adjacent to said braking surface of the spool, and said thumb rest positioned eccentrically in relation to said braking surface whereby a movement of the thumb along said rest will vary the pressure of the thumb upon said braking surface.

3. A fishing reel comprising, a frame, a spool rotatably mounted upon the frame, a braking surface formed upon the spool, a plate secured upon said frame positioned adjacent to said braking surface, and said plate having an aperture formed through the same for the partial insertion of the thumb for applying pressure to said braking surface for retarding the movement of the spool.

4. A fishing reel comprising, a frame, a spool rotatably mounted upon the frame, a braking surface formed upon the spool, a plate secured upon said frame positioned adjacent to said braking surface, and said plate having an elongated tapering opening formed through the same for the insertion of the thumb at the larger end thereof and the partial insertion of the thumb at the smaller end thereof whereby varying degrees of pressure may be applied by the thumb to said braking surface of the spool.

5. A fishing reel comprising, a frame, a spool rotatably mounted upon said frame, a cylindrical brake drum upon the spool, a plate having an aperture formed through the same for the insertion of the thumb, said plate secured upon said frame adjacent to the braking surface of the drum whereby the thumb may press upon the drum and partially rest upon said plate, a brake shoe operatively mounted upon said frame, a lever for moving the brake shoe into and out of engagement with said drum, and a latch mounted upon the frame for detachably engaging the lever.

In testimony whereof I affix my signature.

HUBERT C. VERHEY.